United States Patent Office 3,576,710
Patented Apr. 27, 1971

3,576,710
BRIGHTENING OF WHITE WATER SLUDGE
Robert J. Mader, Wisconsin Rapids, and Douglas E. Moldenhauer, Plover, Wis., assignors to Consolidated Paper, Inc., Wisconsin Rapids, Wis.
No Drawing. Filed July 28, 1969, Ser. No. 845,483
Int. Cl. D21c 9/10; D21f 1/66
U.S. Cl. 162—79                                  6 Claims

ABSTRACT OF THE DISCLOSURE

Brightening a save-all sludge recovered from the whitewater of a paper making process which comprises treating it with zinc hydrosulfite prior to introducing it to an aqueous paper furnish, and the production of paper therefrom of improved brightness as compared to the employment of sludge which has not been so pretreated.

---

This invention relates to the improvement of paper brightness and as a preliminary thereto improvement in the brightness of a save-all sludge employed as a part of the furnish.

Paper brightness is a major importance in paper making and in the past sludge has been one of the components of paper with the lowest brightness. Sludge is the solid component of whitewater, whitewater being the material not retained on the paper making wire and in addition to the water a certain amount of solids of the paper making furnish pass through the wire such as some of the cellulose fibers and fillers which may have been added to the paper furnish. These fillers may be such as alum, clay, starch, brightening agents such as titanium dioxide together with residue from returned broke, i.e., waste finished paper containing clay, and starch and other fillers together with clay which may have been added as a filler to the paper furnish. The cellulose fibers of the paper furnish may be composed for example of 50% groundwood pulp and 50% sulfite pulp.

The sludge is recovered from the whitewater by a conventional save-all system which may be of a sedimentation type although not restricted thereto. Under conventional operating conditions, sludge is pumped from the save-all to a sludge tank and from there fed by gravity into the paper machine just where it is reintroduced into the paper making machine as part of the furnish. Sludge produced by such method contributes very little to and as a matter of fact detracts from the brightness of the paper in which it is incorporated.

Conventionally, sludge comprises from about 4% to about 6% by weight of the furnish solids, and the sludge may comprise approximately nine-tenths cellulose fibers and about one-tenth filler materials of the class hereinabove indicated, the sludge having a pH of about 4.3 as received from the save-all.

In accordance with the present invention, we improve the brightness of the sludge of the foregoing class by treating it with from about 2% to about 12% and preferably from about 2% to about 4% by weight of zinc hydrosulfite ($ZnS_2O_4$) based on hte sludge solids. Although heating temperatures can be from about 75° F. to about 180° F., the operation can be satisfactorily carried out at a temperature of from about 75° F. to about 95° F. to result in a sludge brightness increase of from about 5 to about 7 points as measured by a General Electric brightness meter, with the resulting increased brightness in supercalendered coated paper made therefrom of from about 1 to about 1.5 points G.E., which is not only an appreciable increase in brightness but a prevention of brightness reduction.

It has been heretofore known to employ zinc hydrosulfite in the bleaching of cellulose pulps such as groundwood pulp for use in the paper making process. However, since zinc hydrosulfite is a reducing agent and easily oxidized it reacts before it can be used on the sludge so that even though a pulp has been bleached by the use of zinc hydrosulfite under normal conditions such bleaching does not leave any residue of zinc hydrosulfite such as would result in obtaining the brightening effects herein obtained. Since the pulp employed may have already been subjected to bleaching with zinc hydrosulfite, although not necessarily restricted thereto, it was unexpected that the sludge recovered from the process could be brightened by a separate treatment with zinc hydrosulfite before reintroduction into the process. In other words, it was found essential to the present invention to employ fresh bleaching liquor on the sludge prior to combining it with the paper furnish.

The following is a typical furnish to a paper making machine including save-all sludge recovered from the whitewater of a previous paper making run:

|  | Percent |
|---|---|
| Groundwood | 35 |
| Sulfite pulp | 38 |
| Kraft soft wood pulp | 20 |
| Bleached sludge | 5 |
| Wet end starch | 1.0 |
| Clay | 1.0 |

The cellulose pulps employed in the foregoing had previously been treated with zinc hydrosulfite, but prior to the addition of the save-all sludge thereto all zinc hydrosulfite had been oxidized and the sludge was therefore treated with fresh zinc hydrosulfite in the amount of 3% of solids by weight of sludge solids at a temperature of 75° F. after leaving the save-all and before introduction to the machine chest as part of the furnish.

The following tables indicate G.E. brightness tests of paper employing sludge treated in accordance with the present process:

TABLE I.—Trial I

|  | Before bleaching | 2% $ZnS_2O_4$ addition to sludge | Bright, changes from before trial to 2% |
|---|---|---|---|
| Sludge | 63.9 | 70.8 | +6.9 |
| Machine regulator | 67.9 | 70.1 | +2.2 |
| Base sheet | 68.4 | 69.4 | +1.0 |
| Coated sheet | 72.2 | 73.3 | +1.1 |
| Supered sheet | 69.1 | 70.2 | +1.1 |

TABLE II.—Trial II

|  | Before trial | During trial | Bright-change from before-during trial |
|---|---|---|---|
| Sludge | 71.3 | 76.1 | +4.8 |
| Machine regulator | 72.6 | 73.5 | +0.9 |
| Base sheet | 72.7 | 74.2 | +1.5 |
| Coated sheet | 75.4 | 76.4 | +1.0 |
| Supered sheet | 72.4 | 73.9 | +1.5 |

The following table shows the advantages of the use of increasing proportions of zinc hydrosulfite to the save-all sludge and the G.E. brightness and gain in points of a coated and supercalendered paper produced employing such sludge and the economics thereof:

BLEACHING NO. 11 SAVE ALL SLUDGE WITH $ZnS_2O_4$

|  | Sludge blank | $ZnS_2O_4$ added to de-aerated sludge | | | |
|---|---|---|---|---|---|
|  |  | 2% | 4% | 8% | 12% |
| Bleaching volume, ml | 300 | 300 | 300 | 300 | 300 |
| Temp., °F | 90 | 90 | 90 | 90 | 90 |
| pH | 4.3 | 4.3 | 4.3 | 4.3 | 4.3 |
| Time, minutes | | 15 | 15 | 15 | 15 |
| Brightness | 85.5 | 86.0 | 86.7 | 87.3 | 88.7 |
| Brightness, gain | | 0.5 | 1.2 | 1.8 | 3.2 |
| $ZnS_2O_4$, lbs./ton base | | 5 | 10 | 20 | 30 |
| Cost $ZnS_2O_4$, per ton base, dollars | | 1.15 | 2.30 | 4.60 | 6.90 |
| Cost point of brightness per ton base, dollars [1] | | 2.30 | 1.92 | 2.55 | 2.10 |

[1] Average=$2.30.

We claim:
1. The method of brightening a save-all sludge recovered from the whitewater of a paper making process which comprises treating said sludge with from about 2% to about 4% by weight of zinc hydrosulfite prior to introducing it to an aqueous paper furnish.
2. The process of claim 1 wherein the treatment is carried out at a temperature of from about 75° F. to about 180° F.
3. The process of claim 1 wherein the treatment is carried out at a temperature of from about 75° F. to about 95° F.
4. The process of claim 1 wherein the sludge comprises from about 4% to about 6% by weight of the furnish.
5. In the process of making paper of improved brightness from a pulp furnish combined with sludge recovered from the white water of the process, the improvement which comprises brightening the sludge with zinc hydrosulfite prior to combining it with the pulp furnish.
6. The process of claim 5 wherein the furnish for the process comprises zinc hydrosulfite bleached groundwood pulp, wherein the zinc hydrosulfite has become oxidized.

References Cited

UNITED STATES PATENTS

| 2,398,420 | 4/1946 | Freeman | 162—79X |
| 2,450,034 | 9/1948 | Cronin | 162—79X |

FOREIGN PATENTS

| 17,391 | 6/1907 | Norway | 162—190 |

S. LEON BASHORE, Primary Examiner

T. G. SCAVONE, Assistant Examiner

U.S. Cl. X.R.

162—190